May 23, 1961  C. G. BIGELOW ET AL  2,985,780
SLOT LINER FOR DYNAMO ELECTRIC MACHINES
Filed March 21, 1958                                2 Sheets-Sheet 1
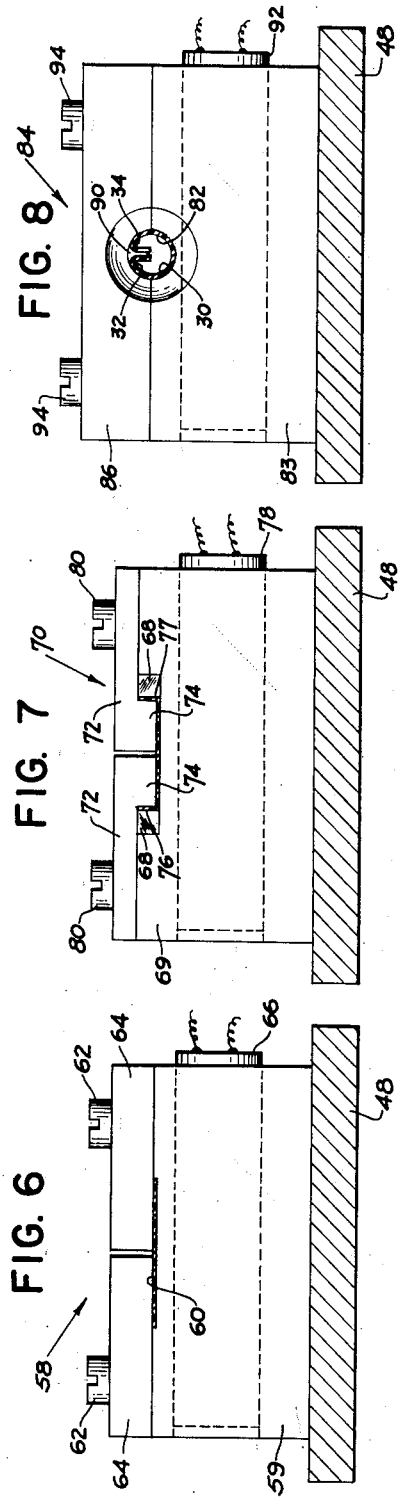
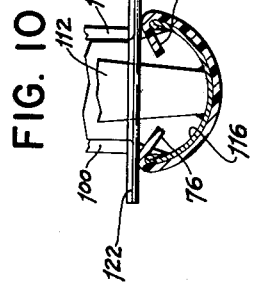
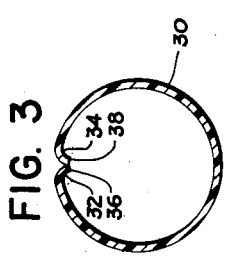
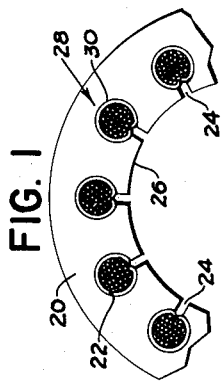
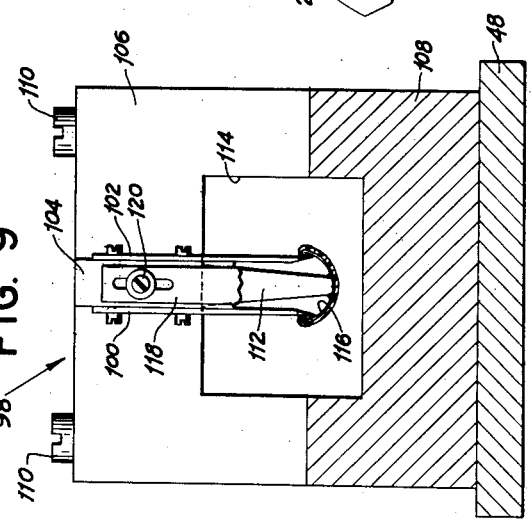
INVENTORS
CHARLES G. BIGELOW
BY  JOHN T. KENNEDY
ATTORNEY

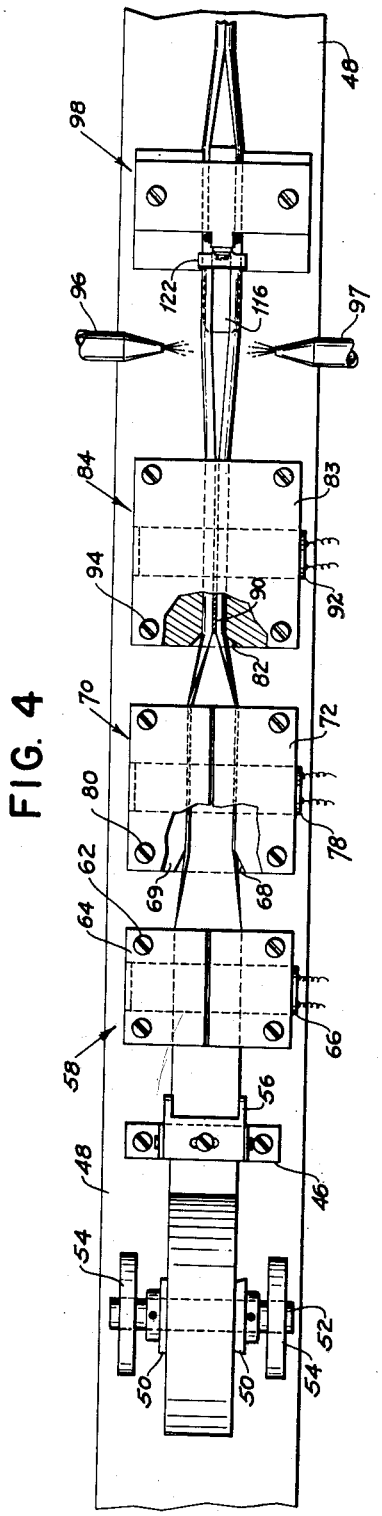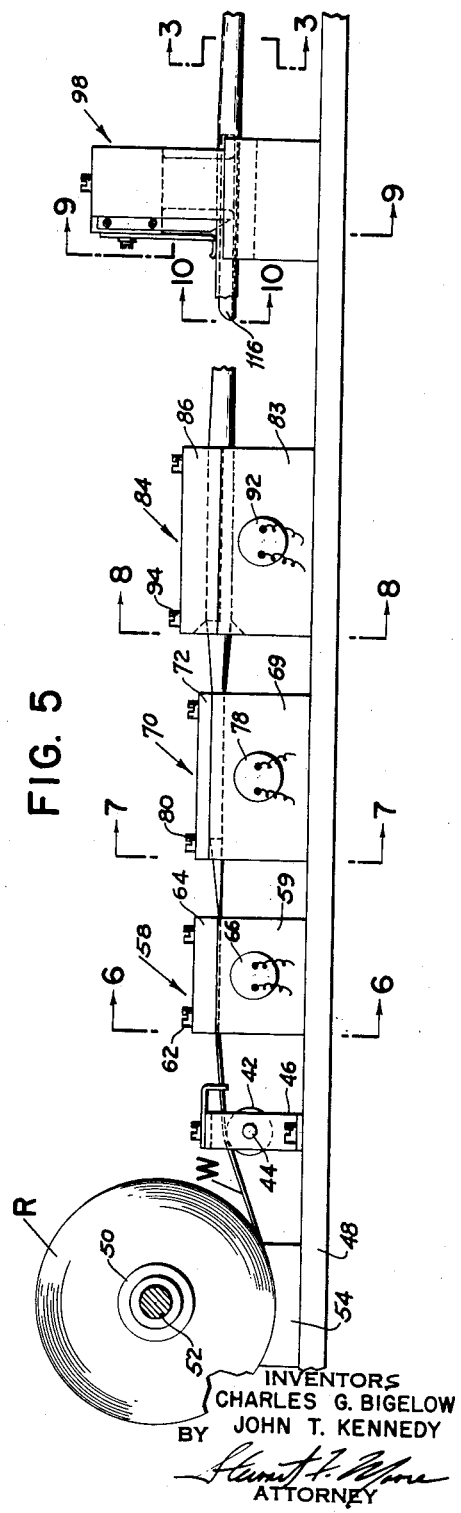

United States Patent Office 2,985,780
Patented May 23, 1961

2,985,780
SLOT LINER FOR DYNAMO ELECTRIC MACHINES

Charles G. Bigelow, Greenwich, Conn., and John T. Kennedy, Poughkeepsie, N.Y., assignors to American Machine & Foundry Company, a corporation of New Jersey Filed Mar. 21, 1958, Ser. No. 723,024

5 Claims. (Cl. 310—215)

This invention relates to dynamo electric machines and more particularly to an improved slot liner for the slots of the core members of such machines.

The stator members of small dynamo electric machines usually have a core member formed from a plurality of thin laminations of magnetic material and have a plurality of radially extending winding slots formed at its inner periphery. The windings of the machine are positioned in these slots and in order that the windings may be insulated from the core, slot insulators are usually positioned therein and enclose the windings.

In the past, coil windings for large machines have been held in place by wedges. In the case of relatively small stators, slot liners have been provided which are adapted to receive complete pre-wound coils. Such liners usually have means for holding the coil firmly in position to prevent removal therefrom through ordinary use after the windings have been inserted in operating position. However, these liners usually require manipulation of a slot closing device after the winding is in place. When employed in small stators with a large number of slots, such as synchros, these liners are cumbersome and difficult, if not impossible, to manipulate. The slots of such stators usually communicate with narrow passageways leading radially inward towards the center of the stator. Because of the small physical size of such passageways, the slot liners which must be used with these stators will not permit manual manipulation of closing and trapping devices after the windings are in place.

Furthermore, the liners of the prior art are not easily adaptable to high speed, automatic machine winding of the coil turns of stators. When coils for very small stators and particularly stators of the precision wound, synchro type are wound automatically, the turns of each coil are inserted separately in a stator slot by a winding machine so that the winding is built up therein, turn-by-turn. Accordingly, a slot liner for automatically wound stator coils must be able to receive each single wire turn by simple insertion therein and hold such turn in place while the remainder of the coil is being wound. Yet, the slot liner must have a wire receiving entranceway with a relatively simple configuration so that the high speed winding device is not required to perform complicated motions in order to guide the wire through the slot. It is preferable that the winding machine be required to perform only a single, lineal winding stroke in causing the wire to pass through the interior of the slot liner.

It is therefore an object of the present invention to provide an improved slot insulator for a dynamo electric machine.

It is another object of the invention to provide a slot liner adaptable for use with small stators having coils precision wound in a turn-by-turn fashion by high speed winding machines.

For a better understanding of the invention, together with other and further objects thereof, reference is made to the following detailed description taken in connection with the accompanying drawings, in which:

Fig. 1 is a partial end elevation of a dynamo electric machine core member having slots provided with an embodiment of the improved slot liner of the present invention.

Fig. 2 is a perspective view of an embodiment of the improved slot liner of the present invention.

Fig. 3 is a sectional end elevation of a completely formed slot liner taken on the lines 3—3 of Fig. 5.

Fig. 4 is a plan view of mechanism for performing the steps of the process for forming the improved slot liner.

Fig. 5 is a side elevation of the mechanism of Fig. 4.

Fig. 6 is a sectional end elevation taken on the lines 6—6 of Fig. 5 illustrating the guide block of the forming mechanism.

Fig. 7 is a sectional end elevation taken on the lines 7—7 of Fig. 5 illustrating a slot liner forming block.

Fig. 8 is a sectional end elevation taken on the lines 8—8 of Fig. 5 illustrating the slot liner cylindrical forming block.

Fig. 9 is a sectional end elevation taken on the lines 9—9 of Fig. 5 illustrating the trimming step in the process of forming the slot liner.

Fig. 10 is an enlarged sectional end elevation of the slot liner spreading and trimming mechanism taken on the lines 10—10 of Fig. 5.

Referring now to the drawings, there is shown in Fig. 1 a fragmentary portion of the stator of a dynamo electric machine (not otherwise shown) which is generally formed of a plurality of thin laminations of magnetic material. For purposes of illustration, a portion of a synchro stator is shown. The stator 20 is formed with a plurality of wire receiving slots 22 each having an opening 24 to the bore 26 of the stator 20. Within each slot 22 is placed a slot liner member 28 which comprises an embodiment of the improved slot liner of the present invention.

The liner is shown in more detail in Figs. 2 and 3 and has a body portion 30 which extends around the interior of the slot 22 and generally assumes the configuration thereof. The body portion 30 is generally U-shaped, but its shape may be modified, depending upon the configuration of the slot with which it is intended to be used. Thus, in instances where the slot liner is employed in connection with synchro stators which generally have substantially circular slot 22 such as shown in Fig. 1, the body portion 30 of slot liner 28 may be modified to form a substantially cylindrical configuration as shown in Fig. 2. It will be understood that body portion 30 may be formed according to the process to be described hereinafter, to assume any modification of a U-shaped configuration as may be desired. For example, the body portion 30 may be substantially rectangular if a particular stator slot configuration so requires.

Slot liner 28 has end portions 32, 34 integrally attached to body portion 30 which are bent so that the edges 36, 38 inwardly converge towards the interior of the slot liner 28. When liner 28 is insertably disposed in slot 22, edges 36, 38 and the immediately adjacent faces of bent ends 32, 34 lie in abutting relationship to each other to define a closable slit 40 which is preferably disposed along the longitudinal axis of the liner 28. In the case where body portion 30 is circular, the liner 28 has a substantially cardioidal, cross-sectional shape, as shown in Fig. 3. The dimensions of the slot liner 28 are so chosen with respect to the dimensions of its associated stator slot 22 that end portions 32, 34 are held in a resiliently biased condition towards each other to cause edges 36, 38 to form slit 40. Slot liner 28 is preferably inserted in slot 22 with peripheral slit 40 communicating with opening 24.

When the coils of stator 20 are wound by placing each turn of the winding in slot 22 to wind a coil directly in the slots, each turn may be guided into position by introducing the coil wire into opening 24 and then moving it radially outward with sufficient force to cause it to pass through slit 40 and into the interior of liner 28. When automatic winding is employed, the individual coil wires may be advantageously laid into the liner 28 by means of a wire distributing nozzle, needle or other device which progressively spreads the slit 40 and allows the wire to pass through the opening thus formed. The inherent resiliency of the liner material recloses the slit. Inasmuch as edges 36, 38 are inwardly convergent, exit of the wire from the interior of slot liner 28 is thereby prevented.

While the slot liner of the present invention is particularly adapted for use with small stators of the synchro type which have their coils wound turn-by-turn directly in the slots, it is equally well suited for use with larger stators of the type wherein the coils are preformed and inserted into the slots as finished units. It will be seen that in either case the windings will be held snugly within the interior of slot liner 28 by the wedging action of inwardly bent end portions 32, 34.

It is necessary to use a material having resilient properties for slot liner member 28, such that end portions 32, 34 retain their inwardly bent shape yet allow slit 40 to open sufficiently to pass a wire therethrough when a stator coil is being wound. A suitable material which is found to be excellent in forming slot liner 28 is polyethylene glycol terephthalate. However, it has been found that unprocessed material of this class will not maintain a particular shape without the constant application of external forces, nor can it be sharply bent without breaking, such as is required to form end portions 32, 34. A novel process for conditioning and shaping the material to form liner 28 and suitable apparatus for carrying out the steps of the process is shown in Figs. 4–10.

Referring to Fig. 4, a web W of suitable liner forming material, preferably thermoplastic, is pulled from a reel R and led over a guide roller 42 which is rotatably mounted on a shaft 44 and held by a bracket 46 secured to base plate 48. The reel is clamped between a pair of flanges 50, adjustably mounted on a horizontal shaft 52, and rotatably supported in suitable bearings by a pair of brackets 54 secured to base plate 48. Web W is adjustably positioned on a roller 42 by means of a pair of guiding fingers 56. It then passes through a block 58 which has an indentation 60 (Fig. 6) disposed in its base 59 for guiding and maintaining web W in a flat, horizontal position. Guiding block 58 is secured to base plate 48 by means of screws 62. Guiding block 58 has a pair of rectangular plates 64 removably secured to base 59 which cooperate with indentation 60 to properly seat web W therein. A suitable electrical heating element 66 is positioned within base 59 and serves as a preheater to warm web W prior to its bending and shaping.

Web W next passes from guiding block 58 through a suitably shaped channel 68 disposed within the base 69 of forming die 70. Forming die 70 has a pair of end plates 72 (Fig. 7) with downwardly projecting ends 74 which cooperate with channel 68 to bend a marginal end portion upwardly from each side of web W to form flanges 76, 77 thereon. Forming die 70 also has an electrical heating element 78 connected to a source of power (not shown) which supplies heat to web W sufficient to cause it to be permanently deformed and assume the configuration shown in cross section in Fig. 7. Plates 72 are secured to forming die 70 by means of screws 80 and the die itself is suitably secured to base plate 48 in proper alignment with guiding block 58.

Web W is next pulled through a U-shaped channel 82 positioned in a base block 83 of second forming die 84. For purposes of illustration, channel 82 is shown as being substantially semicircular in cross section. Forming die 84 (Fig. 8) has a rectangular plate 86 mounted adjacent the upper side thereof with a channel 88 formed therein and disposed in mating registry with channel 82. The upper surface of channel 88 has a guiding and forming rib 90 mounted longitudinally therein. It will be seen that web W is formed by its passage through forming die 84 into a tubular shape with a U-shaped body portion 30 and end portions 32, 34. Forming rib 90 serves to guide flanges 76, 77 through die 84 in vertical alignment with each other and accordingly correctly position the tubular liner during its travel through the die 84. Die 84 also has a heating element 92 connected to a source of power (not shown) which provides sufficient heat to permanently form web W into the slot liner configuration shown in Fig. 2. Plate 86 is secured to forming die 84 by means of screws 94 and forming die 84, in turn, is secured to base plate 48 in proper alignment with forming die 70.

As web W is preferably formed from a thermoplastic material, it is permanently deformed to attain the shape provided by forming dies 70 and 84. However, due to its thermoplastic nature, it is preferable to cool web W so that it will permanently maintain this final form before passing on to the next step in the manufacture of the slot liner 28. Thus, cooling means are provided which may be a stream of air supplied by suitably positioned air nozzles 96, 97 connected to a source of air supply (not shown) or by any other suitable means for providing cooling of the slot liner material after it passes through forming die 84.

In order that stator slots 22 may be filled with a maximum amount of wire, if desired, it is necessary that flanges 76, 77 be removed from end portions 32, 34. Sufficient material should, of course, remain to provide for the inward convergence of edges 36, 38 as described hereinbefore. Removal of flanges 76, 77 is provided by passing web W of the partially formed liner through a spreader and trimmer 98. Trimmer 98 has a pair of knives 100, 102 (Figs. 9, 10) vertically mounted on the sides of an outwardly extending projection 104 of block 106. Trimmer 98 also has a base block 108 to which knife mounting block 106 is secured by means of screws 110. A support member 112, centrally mounted in a rectangular cut-out area 114 of blocks 106, 108, has a spreading trough 116 attached to its lower surface. Trough 116, positioned in the path of travel of the partially completed slot liner 28, spreads the end portions 32, 34 of liner 28 to facilitate the cutting operation and guides flanges 76, 77 into cutting position with respect to knives 100, 102. A bracket 118, adjustably secured to the outer face of projection 104 by means of screw 120, has a foot 122 (Figs. 4, 10) which firmly rests against end portions 32, 34 and cooperates with trough 116 to hold the slot liner 28 in position as it is being spread and trimmed.

After passing through trimmer 98, the liner springs back to the shape effected by former 84. It will be seen that upon passing through trimmer 98, the flanges 76, 77 are removed from the slot liner 28. It is then in a completely formed condition and ready to be cut into selected lengths according to the design of the particular stator for which it to be used.

While the present invention has been disclosed by means of specific illustrative embodiments thereof, it would be obvious to those skilled in the art that various changes and modifications in the means of operation described or in the apparatus may be made without departing from the spirit of the invention as defined in the appended claims.

We claim:

1. A slot liner formed from resilient insulating material for use in the slots of a dynamo electric machine core member comprising, a body portion adapted to line the interior of a slot, and end portions of substantially similar configuration bendably secured to each end of said body portion, said end portions being inwardly convergent towards the center of said body portion with complementary faces abutting each other along the length of said slot to allow the insertion of coil turns in the slot and adapted to spring back thereafter to close the entrance to the interior of said body portion to prevent exit of the coil turns therefrom.

2. A slot liner formed from resilient insulating material for use in the slots of a dynamo electric machine core member comprising, a U-shaped body portion adapted to line the interior of a slot, and upper portions of the legs of said U being resiliently bent to converge towards the central interior of said U and having complementary faces of substantially similar configuration sealably abutting each other along the length of said slot to allow the insertion of coil turns in the slot and adapted to spring back thereafter to close the entrance to the interior of said U to prevent exit of coil turns therefrom.

3. A slot liner formed from resilient insulating material for use in the slots of a dynamo electric machine core member comprising, a substantially cylindrical body portion adapted to line the interior of a slot, said cylindrical body portion having a slit with marginal edges inwardly bent to converge towards the central axis of said cylindrical body portion and having complementary faces of substantially similar configuration abutting each other along the length of said slot to resiliently close said slit, said slit being adapted to guide a discrete wire of a coil turn to the interior of said slot while preventing exit therefrom.

4. A slot insulator formed from resilient insulating material for use in the slots of a dynamo electric machine core member comprising, a liner portion having a cardioid configuration and adapted to line the interior of a slot, said liner portion having cusp portions of substantially similar configuration resiliently biased against each other with marginal edges extending inwardly to converge towards the central interior of said liner, said cusp portions facing the longitudinal entrance to said slot and adapted to permit the insertion of the turns of a coil to the interior of said slot while preventing exit therefrom.

5. A slot liner member formed from resilient insulating material for use in the slots of a dynamo electric machine core member comprising, a body portion adapted to closably line the interior of a slot, said body portion having a wire receiving portion comprising a closable slit peripherally disposed of the longitudinal axis of said liner portion and in alignment with the entrance of said slot, said slit having inwardly converging wire guiding portions of substantially similar configuration resiliently biased in abutting relationship to each other and adapted to guide a discrete wire of a coil turn to the interior of said slot while preventing exit therefrom.

References Cited in the file of this patent

UNITED STATES PATENTS

| | | |
|---|---|---|
| 2,508,850 | Wirth | May 23, 1950 |
| 2,778,964 | Balke | Jan. 22, 1957 |
| 2,848,751 | Vernon | Aug. 26, 1958 |

FOREIGN PATENTS

| | | |
|---|---|---|
| 587,773 | Germany | Nov. 8, 1933 |
| 1,141,838 | France | Sept. 9, 1957 |